United States Patent [19]

Woolington et al.

[11] Patent Number: 4,597,700
[45] Date of Patent: Jul. 1, 1986

[54] RECORD ENGRAVING APPARATUS

[75] Inventors: John C. Woolington, Harbor City; James A. Chenoweth, Torrance, both of Calif.

[73] Assignee: Mattel, Inc., Hawthorne, Calif.

[21] Appl. No.: 690,695

[22] Filed: Jan. 11, 1985

[51] Int. Cl.$^4$ ............................................. B23D 5/02
[52] U.S. Cl. .................................... 409/292; 82/1.1; 369/84
[58] Field of Search ............... 29/56.5, 20.1, 169.5, 29/558; 409/292, 289, 291, 348; 82/1.1; 369/127, 153, 72, 85, 276, 84

[56] References Cited

U.S. PATENT DOCUMENTS

| | | | |
|---|---|---|---|
| 1,649,847 | 11/1927 | Nightinghall | 369/160 |
| 2,595,795 | 5/1952 | Kovach | 369/277 |
| 2,940,368 | 6/1960 | Walter et al. | 409/348 X |
| 2,948,783 | 8/1960 | Scully | 82/1.1 |
| 3,136,936 | 6/1964 | Eisengrein | 409/289 |
| 3,186,029 | 6/1965 | Joseph | 82/1.1 X |
| 3,420,967 | 7/1963 | Goldmark | 369/85 |
| 3,528,665 | 10/1974 | Redlich | 369/127 |
| 3,837,656 | 9/1974 | Pradervand | 369/72 |
| 3,842,194 | 10/1974 | Clemens | 369/54 |
| 3,909,517 | 9/1975 | Clemens | 369/276 |
| 4,248,438 | 2/1981 | Knothe et al. | 369/127 |

Primary Examiner—William R. Briggs
Attorney, Agent, or Firm—Ronald M. Goldman; John G. Mesaros; Melvin A. Klein

[57] ABSTRACT

A record engraving apparatus having a table with a vacuum source for retaining thereon a master lacquer with portions thereon having pre-recorded disc-shaped record portions. The rotatable table is precisely positionable in all directions of the plane of the table as well as in orthogonal directions, and includes provision for mounting the master lacquer with the center thereof in one of at least two locations depending on the center of the record portions relative to the master lacquer. A vertically adjustable arm is provided with a turret head having thereon a plurality of heated sapphire cutters of different sizes, each of which may be indexed into position. The arm is adjustable in a direction orthogonal to the plane of the table to provide variations in depths of cuts.

20 Claims, 12 Drawing Figures

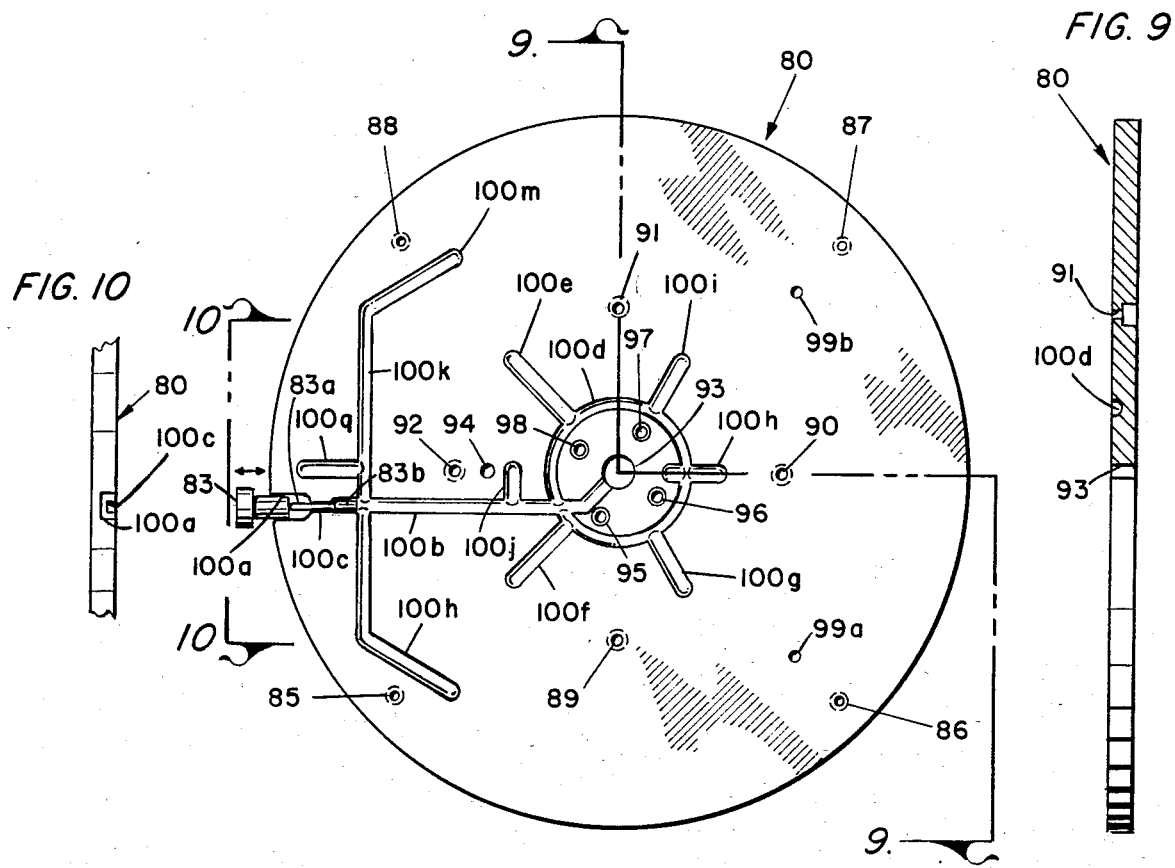
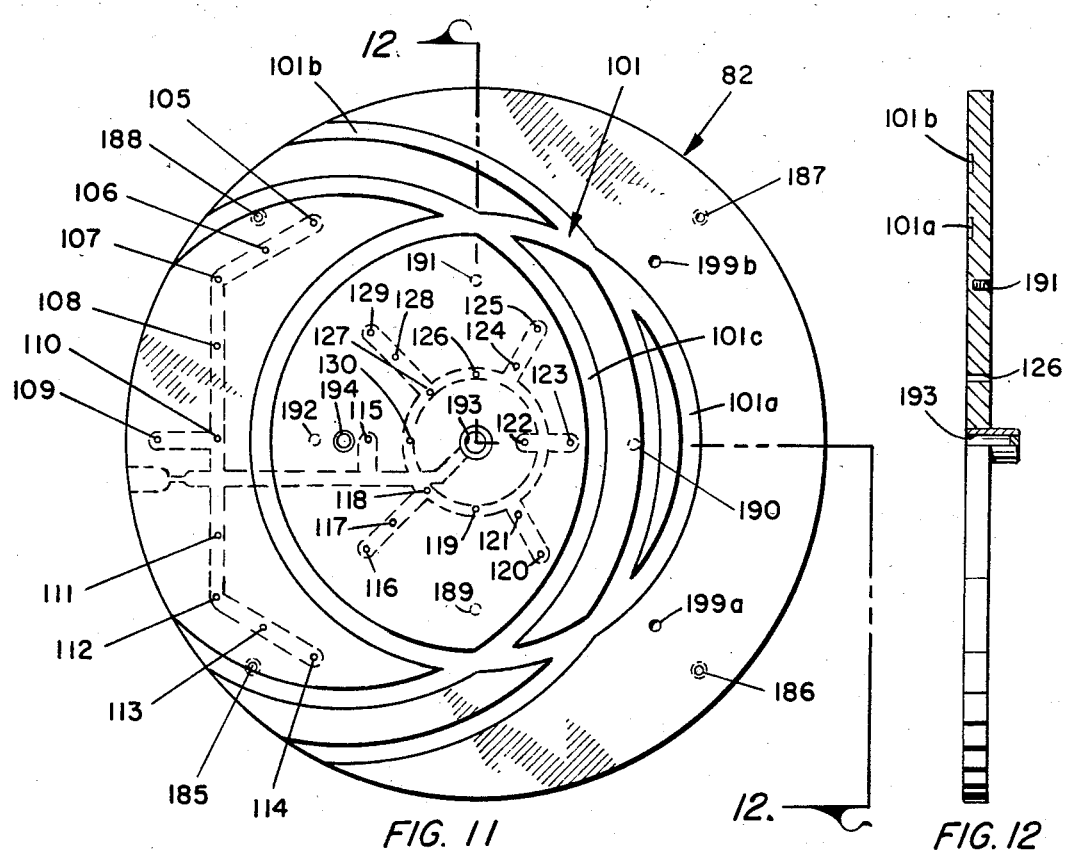

RECORD ENGRAVING APPARATUS

BACKGROUND OF THE INVENTION

The background of the invention will be discussed in two parts:

1. Field of the Invention

This invention relates to record engraving apparatus, and more particularly to an improvement of a record engraving apparatus for forming lead-in and lead-out tracks on a master record, or master lacquer.

2. Description of the Prior Art

Records having generally spiral grooves for tracking by a phonograph needle have been used in various devices for electronic or mechanical reproduction of sound.

In various toys, a phonograph record is used having interleaved tracks, that is, each track includes a separate lead-in groove at the periphery of the record disk, in contrast to conventional phonograph records, in which essentially a single spiral track is produced across the surface of the disk, with each recording separated from the next by a separate lead-in track of a different pitch coextensive with the lead-out track of the previous recording. In either event such record disks are formed by the use of suitable recording apparatus.

Each groove of the disk in such toys is recorded with a different song or phrase. In forming the master disks for such records, in the past, the individual interleaved spiral grooves of the master lacquer have been cut using conventional techniques. Thereafter, the lead-in and lead-out grooves in the master lacquers have been cut manually, and require precision arrangement to insure proper operation of the toy or device in which used.

A device for recording sound is shown and described in U.S. Pat. No. 1,649,847, issued Nov. 22, 1927, to Nightinghall. This apparatus includes a heated recording stylus which is maintained in contact with the record surface to generate a helical groove therein.

Another apparatus is shown and described in U.S. Pat. No. 2,595,795, entitled "Spiral and Eccentric Groove Cutter for Phonograph Records and the Like", issued May 6, 1952, to Kovach. This apparatus is adapted for coaxial mounting with the record in which the grooves are to be cut.

Another apparatus is shown and described in U.S. Pat. No. 3,420,967, entitled "Disc Recording and Reproducing System", issued July 1, 1963 to Goldmark. This system is intended for recording information upon a record disc in less time than the playback time. This system includes electronic filter means to assist in the increased speed of recording.

Another apparatus is shown and described in U.S. Pat. No. 3,837,656, entitled "Chip Removal in the Mastering of Fine-Grooved Discs", issued Sept. 24, 1974, to Pradervand. This apparatus provides a source of heated air and a chip collector adjacent thereto for removing chips generated during cutting. Another apparatus is shown and described in U.S. Pat. No. 3,528,665, entitled "Method and Apparatus for Cutting a Groove in the Surface of an Original Recording Disc", issued Oct. 15, 1974 to Redlich. This apparatus is directed to means using a cutting stylus in such a way to completely remove the original surface of the disk.

Another apparatus is shown and described in U.S. Pat. No. 3,842,194, entitled "Information Records and Recording/Playback Systems Therefor", issued Oct. 15, 1974, to Clemens, and discloses a storage medium comprising a metallized base material having a dielectric coating thereon for use with a capacitance responsive stylus system.

Another apparatus is shown and described in U.S. Pat. No. 3,909,517, entitled "Disc Records with Groove Bottom Depth Variations", issued Sept. 30, 1975, to Clemens, this patent disclosing an improvement of the preceding Clemens patent. Another apparatus is shown and described in U.S. Pat. No. 4,248,438, entitled "Mechanical Record Cutting Method", issued Feb. 3, 1981, to Knothe, et al, the apparatus providing a stylus for electromechanically cutting a groove in a copper coated metal surface of a master disk with a cutting angle of the stylus of between 10 to 20 degrees. This apparatus is adapted for coaxial mounting with the record in which the grooves are to be cut.

It is an object of the present invention to provide a new and improved record engraving apparatus.

It is another object of the present invention to provide a new and improved computer numerically controlled apparatus for engraving a master disc or master lacquer.

It is a further object of the present invention to provide a new and improved record engraving apparatus for enabling precise cutting of lead-in and/or lead-out grooves on a master lacquer having interleaved spiral record grooves.

SUMMARY OF THE INVENTION

The foregoing and other objects are accomplished by providing a record engraving apparatus having a table with a vacuum source for retaining thereon a master lacquer with portions thereon having disc-shaped records. The rotatable table is precisely positionable in all directions of the plane of the table as well as in orthogonal directions. A vertically adjustable arm is provided with a turret head having thereon a plurality of heated sapphire cutters of different sizes, each of which may be indexed into position. The arm is adjustable in a direction orthogonal to the plane of the table to provide variations in depths of cuts.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 8 is a top plan view of the lower plate used to form the table top of the apparatus of FIG. 4;

FIG. 9 is a right end view, partially in cross-section, of the lower plate of FIG. 8 as viewed generally along the 9—9 thereof;

FIG. 10 is a partial left end view of the lower plate of FIG. 8 as viewed generally along line 10—10 thereof;

FIG. 11 is a top plan view of the upper plate used to form the table top of the apparatus of FIG. 4; and FIG. 12 is a right end view, partially in cross-section, of the upper plate of FIG. 11 as viewed generally along line 12—12 thereof.

DESCRIPTION OF THE PREFERRED EMBODIMENT

Figure 1:
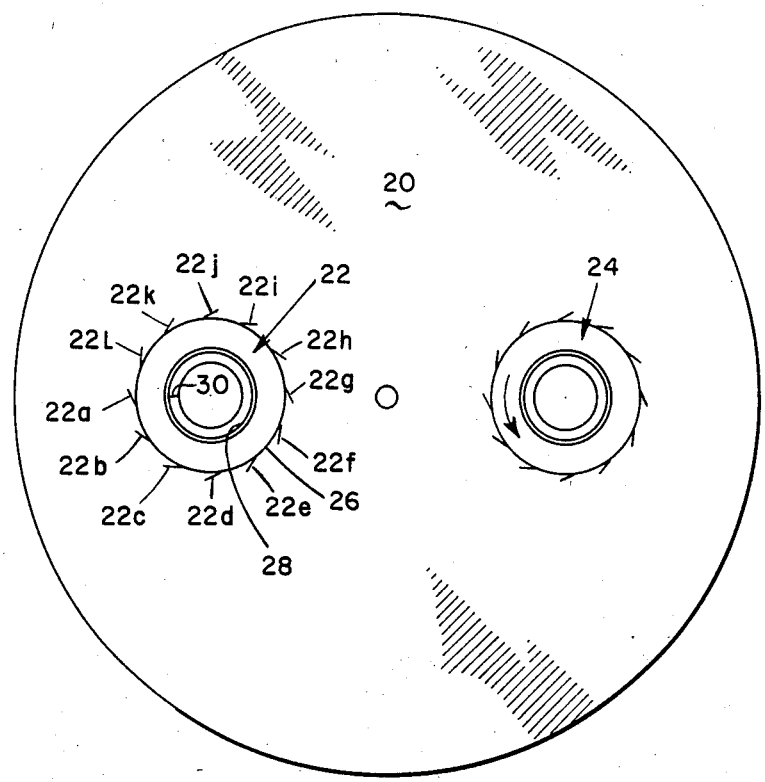
FIG. 1 is a top plan view of a master lacquer having record portions thereon with lead-in grooves engraved thereon with the record engraving apparatus according to the present invention.

Referring now to the drawings, and particularly to FIG. 1 there is shown a master lacquer, generally designated 20, having formed thereon first and second record portions, designated 22 and 24, each of the record portions 22 and 24 having a plurality of spirally outwardly extending lead-in grooves designated, in counterclockwise direction, 22a–22l and 24a–24l, respectively. There can be up to forty interleaved tracks on each of these record portions 22 and 24, with twelve such grooves being shown for illustration. The lacquer 20 is an aluminum disc covered with a lacquer coating, and in this instance a number of small record portions are "mastered" on the common disc or lacquer 20 for reproduction on other materials. The lead-in grooves 22a–22l and 24a–24l are short shallow grooves of 0.01 to 0.04 inch depth, which must be accurately placed and exact in length, depth and angle of cut.

Referring to record portion 22, the outer circumference 26 defines the outer edge of the recorded portion having sound tracks, while the inner circle 28 is a deep groove lead-out groove, which is essentially the inner boundary of the tracks bearing recorded information. This deep cut single lead-out groove 28 could be replaced by a series of lead-out grooves formed in the same manner as lead-in grooves 22a–22l. Radially inwardly from lead-in groove 22a, inwardly of lead-out groove 28, there is a radially extending segment 30 which is the index mark for the number one record groove into which lead-in groove 22a extends. Although not discussed in detail, it is to be understood that the record portion 24 is similarly configured and arranged, the basic difference between the two record portions 22 and 24 being the information recorded on the sound tracks thereof. Also, it is to be understood that other record portions may also be formed on the master lacquer 20, although only two are shown.

The record portions 22 and 24 have sound tracks, which, although not shown, are "interleaved", that is the beginning of each sound track is at the periphery and coincides with one of the lead-in grooves 22a–22l, inclusive. The ends of all sound tracks are shown as terminating at the runout or lead-out groove 30, but could, of course, terminate at individual lead-out grooves.

The sound-reproducing mechanism utilizing these records requires precision in positioning of the lead-in grooves, as well as precison in contour, length, depth and configuration. In addition, all of the grooves on each record portion 22 and 24 must be accurately positioned relative to the index mark 30. Although an index mark 30 is not shown on record portion 24, it is to be understood that such an index mark would likewise be provided in radial alignment with the first lead-in groove thereof. To appreciate the order of magnitude of the accuracy required, it is to be emphasized that the record portions 22 and 24 have a diameter of one and one-half inches to slightly more than four inches, with as many as forty interleaved sound tracks recorded on the outer radial one-half to one inch of the disc. With the twelve lead-in grooves 22a–22l shown, each must be accurately placed every thirty degrees, and must align with one of the sound tracks. Similarly, with forty such grooves, each would be placed every nine degrees. In practice the sound track portions appearing between the outer circumference 26 of the record portion 22 and the lead-out groove 28 are pre-recorded or engraved on the lacquer in any manner desired, as by a master cutting lathe, with the lead-in grooves 22a through 22l, inclusive, being engraved by the apparatus to be described. In the past, with such records, these lead-in grooves were cut by artisans, by hand.

Figure 2:
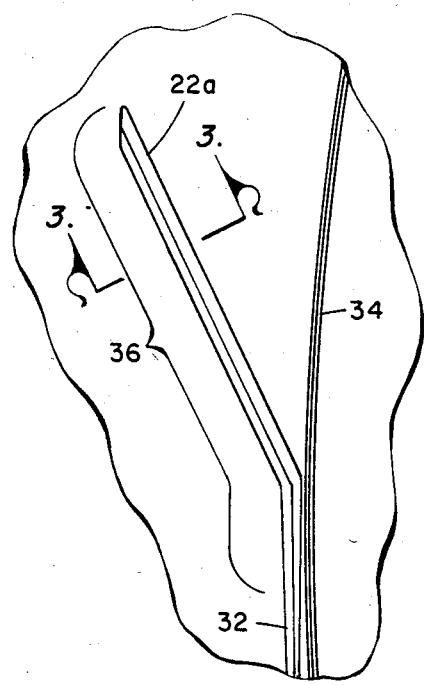
FIG. 2 is an enlarged partial view of one of the record portions of the master lacquer of FIG. 1 to illustrate a lead-in groove thereof.
Figure 3:
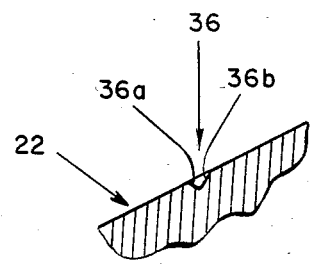
FIG. 3 is a cross-sectional view of the lead-in groove of the record portion of FIG. 2 as viewed generally along line 3—3 thereof.

As shown in enlarged illustration in FIGS. 2 and 3, two sound tracks 32 and 34 are shown with lead-in groove 22a ultimately connecting with the outer sound track 32. The bracketed portion, designated by reference numeral 36, is that portion which is cut or engraved utilizing the improved record engraving apparatus of the invention. In cutting this portion, referring also to FIG. 3, it can be seen that the groove 36, in cross-section, has one side 36a cut at a different angle than the other side 36b, the side 36a being at an angle of thirty degrees to the vertical, while the side 36b is at an angle of sixty degrees to the vertical. In addition, as shown in FIG. 2, the groove portion 36, from the end, extends inwardly in a spiral direction, and then must change direction to circumferential to blend smoothly with the outer sound track 32, with the width of the groove portion 36 diminishing as it nears the beginning of sound track 32, thus requiring elevation of the cutter at this point to provide the needed transition.

Although the master lacquer 20 in FIG. 1 is shown as having offset record portions 22 and 24, it is to be understood that for a larger record, the record portion may be positioned at the center of the lacquer 20. In such master lacquers 20, ten inch, twelve inch and fourteen inch diameters are standard sizes, and the apparatus to be described will readily accommodate such sizes. In such lacquers, the perimeter is generally thicker than the central portion, with this difference in thickness being on the undersurface of the lacquer. With small record portions, such as record portions 22 and 24, although two are shown, typically a master lacquer would contain as many as six record portions, with the centers of all record portions lying on a common radius, that is, the center of each record portion 22 and 24 would be the same distance from the center of the lacquer 20.

The apparatus for producing the engraving of these lead-in grooves 22a through 22l, inclusive, is shown in FIGS. 4 through 7, and is basically an improved version of a computerized numerically controlled (CNC) milling machine configured especially for the engraving of records.

As is known to those in the machining art, a CNC milling machine can be controlled by suitable digitally recorded media, such as perforated paper tape, or magnetically recorded tape to faithfully reproduce a desired cut in a given plane of a block of metal or the like, with precision accuracy. This can be accomplished on any of the three axes, that is, the X-axis, the Y-axis, and the Z-axis. In such machines, a table is provided for holding the workpiece, with controls to effect X, Y and Z movement with respect to a cutting tool. In such machines a "fourth" dimension of control may be effected by providing a rotatable or angularly positionable table.

In accordance with the present invention, the basis for the improvement is a mini milling machine designated Model #7501 manufactured and sold by Servo Products Company at 433 N. Fair Oaks Avenue, Pasadena, Calif. The basic machine includes a fourth axis servo rotary table and associated electronics with the normally provided motorized milling head removed.

Briefly, as will be hereinafter described, to the basic machine, a Z-axis arm is provided with a turret suspended therefrom at the workpiece location, the turret including a plurality of heated sapphire cutters which are individually indexable into cutting position. Electrical means are provided for controlling the heating of the cutters. This arm also supports the vacuum operated chip or debris pick-up tube. A vacuum plate is provided for attachment to the rotary table for holding the master lacquer thereto, the rotary table, in turn, being attached to the servo controlled machine table, thus allowing any combination of "X", "Y", "Z", or angular positioning of the master lacquer 20 to cut the contours of lead-in grooves 22a–22l, as desired. For inspection purposes a binocular microscope 212, and a high intensity light source are provided.

Referring now to FIGS. 4 through 7, the apparatus includes a base 40, preferably formed of a heavy cast iron with machined surfaces as required. To this is fixedly secured an upwardly extending post member 42, at the rear center thereof, the post 42 being generally perpendicular to the plane of the base 40. The post 42 is likewise formed of a heavy material, such as cast iron, suitably machined, as required.

The base 40 is provided with a generally planar upper surface 40a, preferably a surface machined to a high tolerance. Mounted for slidable movement thereon is a Y-axis table 44, suitably coupled through appropriate gearing for movement in the Y-axis direction, that is from the front of the base 40 toward the rear thereof. To limit the rearward movement of the Y-axis table 44, at the leading end thereof it is provided with a downwardly depending plate member 45, which is a Y-axis stop member depending below the bottom surface 44a of the Y-axis table 44 to abuttingly engage the leading end of the base 40 to limit the rearward movement of table 44.

The upper surface 44b of the table 44 is machined to a planar surface for slidably receiving thereon an X-axis table 46, which is suitably geared and controlled for movement in a direction orthogonal to the direction of movement of the Y-axis table 44. As is well known in such machines, the tables 44 and 46 are coupled to each other and to the base 40 by suitable devices such as dovetail arrangements, the dovetail members interconnecting base 40 and table 44 generally extending from front to rear relative to the base 40, with the dovetail interconnection members of table 44 and table 46 extending from side to side relative to the base 40. Although not shown it is to be understood that precision positioning servo motors are coupled to the respective tables 44 and 46 for enabling movement thereof in the "X" and "Y" directions, with suitable electronic circuits provided for controlling the energization of such motors very precisely in response to the digital inputs from the digital control media, be it stored digital information, perforated paper tape or magnetic signals on tape or disc.

A generally L-shaped plate member 48 has the leg 48a thereof securely affixed to the X-axis table 46 by suitable fasteners such as cap screws 50, with the leg 48b extending upwardly at right angles to leg 48a at the front end of X-axis table 46. Consistent with such precision machines, the member 48 is formed of a heavy material such as one-half inch steel of precision dimension. Clamped to leg 48b is a journal support member 52 of an open framework construction with a plate portion 52a configured for attachment to the leg 48b by suitable means such as nut and bolt assembly 54, and cap screw 56. Extending generally perpendicular to the plate portion 52a is a yoke portion 52b, the upper edge 52c thereof being a machined surface.

The yoke portion 52b is configured for receiving therein a generally cylindrically configured journal assembly, generally designated 60, which includes a cylindrical housing 60a, having the lower end thereof enclosed by a plate member 60b secured thereto by a plurality of cap screws 61. At the upper end of housing 60 there is supported a bearing or journal member 60c having an enlarged circular flange 60d configured for supporting thereon a rotatable table assembly generally designated 64. Additional strap members 53 interconnect the housing 60 and the L-shaped plate member 48 to provide additional support. Also coacting with the table 64, although not shown, is a suitable precision servo motor for providing rotational positioning of the table assembly 64, in accordance with signals provided by the electronic circuitry.

The thus far described machine, excluding the table assembly 64, is the basic portion of the Servo Products CNC mini mill, hereinabove referred to. Although a table is provided with the mini mill, the table is modified to provide an offset position for the lacquer 20 with vacuum means added as will be hereafter described.

To this basic machine, the improvements thereto include the table assembly 64, the arm, generally designated 66, the arm support bracket 68, the turret assembly, generally designated 70, and control means for providing control of the heating of the cutters of the turret assembly 70. For enabling the application of vacuum to the table assembly 64, the housing 60a is sealed to act as a vacuum chamber with the front portion of housing 60a being provided with a vacuum fitting 60e for connection to tubing, which ultimately connects with a vacuum source. The housing 60a is sealed with the journal 60c being provided with an axially extending aperture for providing vacuum to the table assembly 64 through the center thereof.

Figure 5:
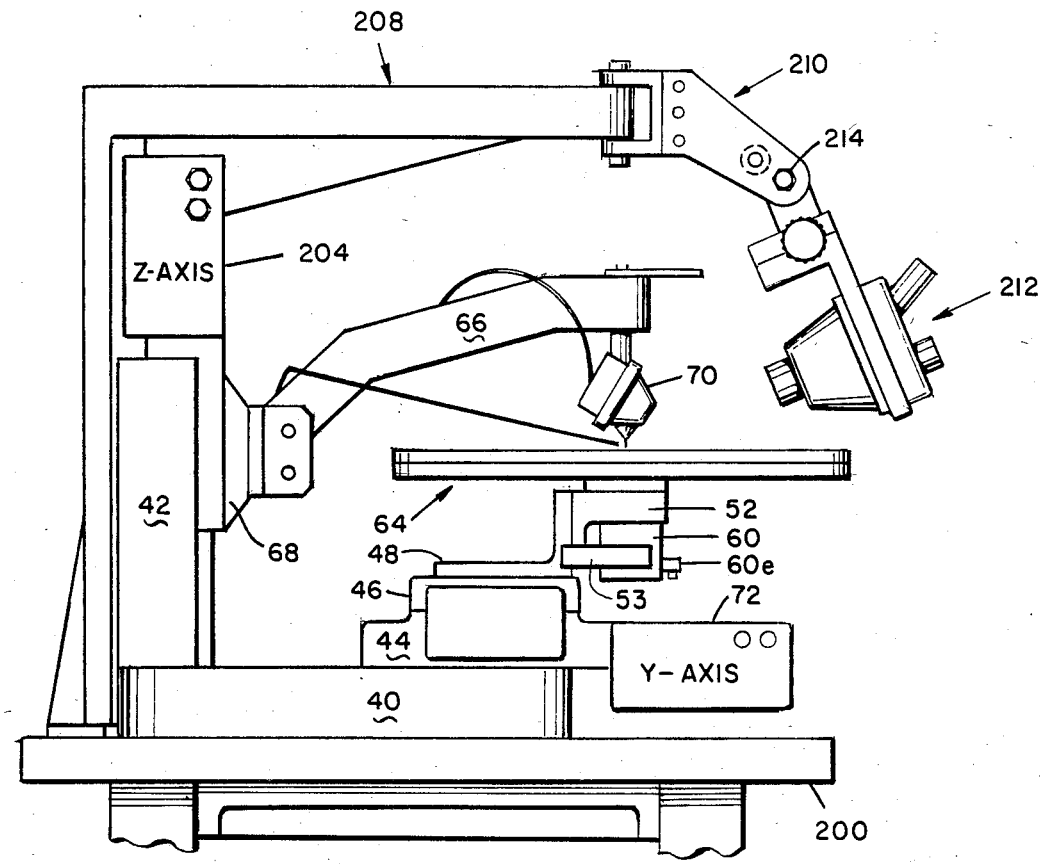
FIG. 5 is a side elevational view of the apparatus of FIG. 4 showing the apparatus supported on a surface with additional items for use in conjunction therewith.
Figure 7:
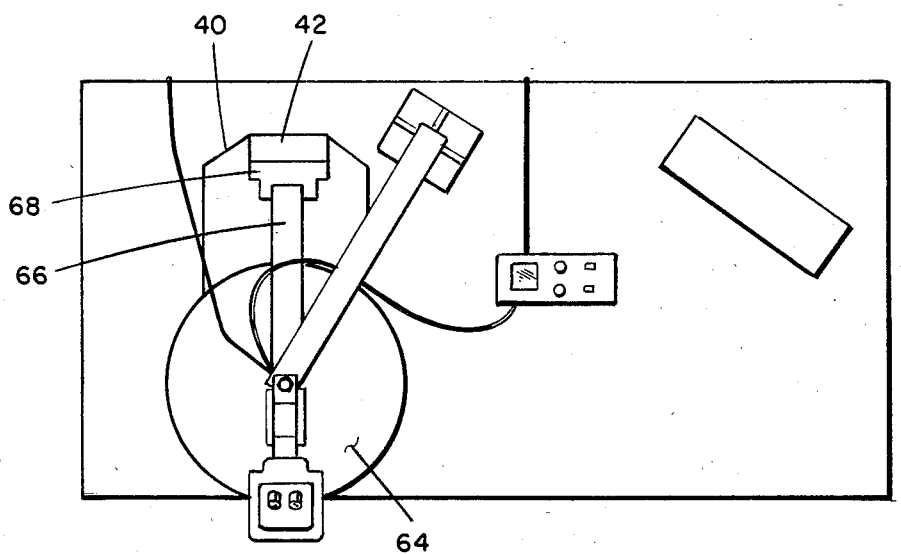
FIG. 7 is a top plan view of the record engraving apparatus of FIG. 4.
Figure 6:
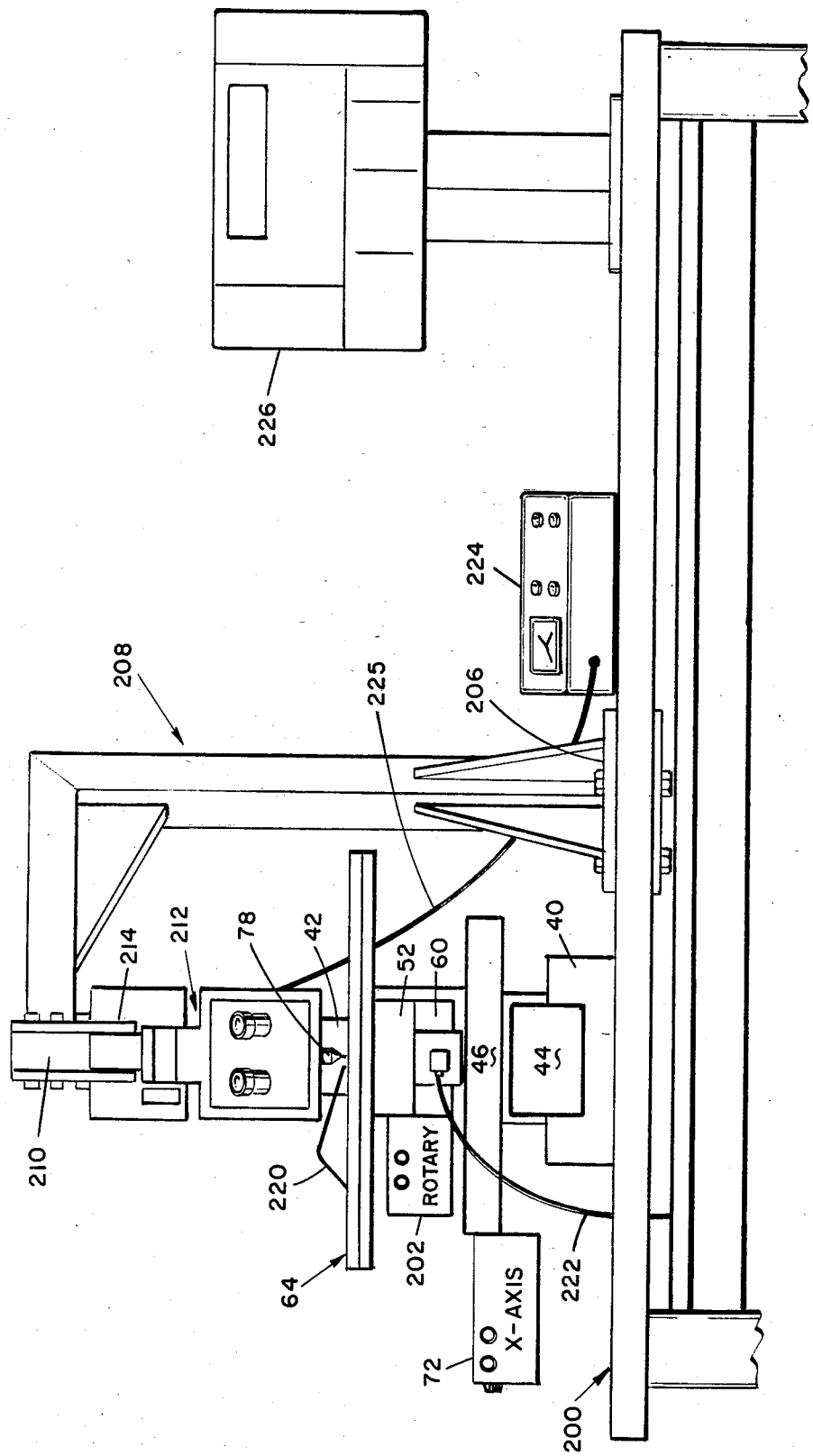
FIG. 6 is a front view of the record engraving apparatus of FIG. 4.

Referring also to FIGS. 5 through 7, the arm support bracket 68 is movably assembled to the support post 42 by suitable gearing means for providing "Z" axis movement of the bracket relative to the support post 42, with the upper end of bracket 68 being provided with a Z-axis stop plate 69 arranged for abutting with the upper end of post 42 at the lower limit of travel of the bracket 68. An upwardly directed clevis 68a is provided at the forward end of the bracket 68 for receiving therein, in snug fitting relation, a support plate portion 66a, at one end of the arm 66, the arm 66 then being attached to the clevis 68a by means of bolts 74 passing through aligned apertures in the clevis 68a and the plate portion 66a.

The arm 66 then follows a direction upwardly and outwardly toward the front of the base 40 with the free end 66b, thereof in overhanging relation to the table assembly 64, the direction of extension of the arm 66 being in a direction generally bisecting the plane of the base 40 along a line from front to rear. At the free end 66b, a vertically extending tapered aperture 66c is provided for receiving therein a tapered shaft 70a supporting the turret assembly 70. The shaft 70a is provided with a threaded upper end for receiving a nut 71, securing the shaft 70a within the aperture 66c, with a key member 70b engaging a vertical slot in the shaft 70a and an aligned slot in the aperture 66c to fix the position of the shaft 70a relative to the arm 66.

The lower end of shaft 70a is securely coupled to a turret bracket 70c which is in fixed relation to the shaft 70a, with the bracket 70c having attached thereto the stationary portion 70d of a turret housing having a circular opening 70e lying in a plane offset at an angle from the axis of the shaft 70a. Rotatably coupled to the opening 70e is the rotatable turret head 70f which has affixed thereto a plurality of heated sapphire cutters 78, 79, (only two of which are shown), each of the cutters being of a different dimension and configuration for effecting the cutting or engraving of the master lacquer 20, as required. In some instances, the cutters, such as cutters 78 and 79 may be identical to facilitate operation in the event of breakage. With two identical cutters on the turret 70, if one breaks, the operator can simply manually rotate the turret 70 to place another cutter of the same configuration in position.

Each of the cutters 78, 79 is positioned at an angle to the turret head 70f so that the axis of the respective cutter is at right angles to the plane of the rotary table assembly 64. Although two cutters are shown, it is to be understood that additional cutters may be attached to the turret head 70f. A metallic slip ring 80 encircles the turret head 70f, with electrical leads interconnecting the ring 80 and the cutters 78, 79. Electricity is supplied to a spring brush 81 which is in constant contact with the ring 80 to provide electricity to the cutters, as required.

Referring now also to FIGS. 8 through 12, inclusive, the details pertaining to the construction of the rotary table assembly 64 will be discussed. The table assembly 64 includes a lower table top 80 (FIGS. 8 through 10) and an upper table top 82 (FIGS. 11 and 12), each being disc-shaped and of equal diameter of slightly less than sixteen inches, with a thickness of about seven-sixteenths of an inch.

Prior to a detailed discussion, briefly, the lower table top 80 is provided with a plurality of interconnected channels with the upper table top 82 provided with a plurality of apertures extending therethrough, the apertures being arranged for general alignment with the channels of the lower table top 80. Other apertures are provided for interconnecting the two tops 80 and 82 to each other, as well as apertures for connection of the lower table top 80 to the rotary flange 60d (see FIG. 4). With the two tops 80 and 82 connected together, a vacuum line is connected in flow communication with the channel means with the vaccum apertures in the upper table top 82 providing means for securing the master lacquer 20 to the table assembly 64. The vacuum is received through the central opening 93 of the top 80. Bushings are provided for indexing and aligning the two tops 80 and 82.

Referring now to FIGS. 8 through 10, the lower table top 80 is generally disc-shaped with a machined upper surface and a generally uniform thickness of about seven-sixteenths of an inch. Two sets of four countersunk apertures each extend through the top 80, the first set including equiangularly spaced apertures 85–88, inclusive, adjacent the perimeter. Radially inwardly, a second set of apertures 89–92, inclusive, are provided on a common circumference of approximately one-half the radius of the lower table top 80. A through hole 93 is at the center of the top 80 with a set of four equiangularly positioned countersunk apertures 95–98 extending therethrough in proximate relation to the center through hole 93. A second offset through hole 94 is provided on the diameter of the top 80, horizontally and to the left as viewed in FIG. 8, either of the through holes 93 or 94 accepting a bushing to serve as the center of the master lacquer 20 when secured to the table assembly 64.

Figure 4:
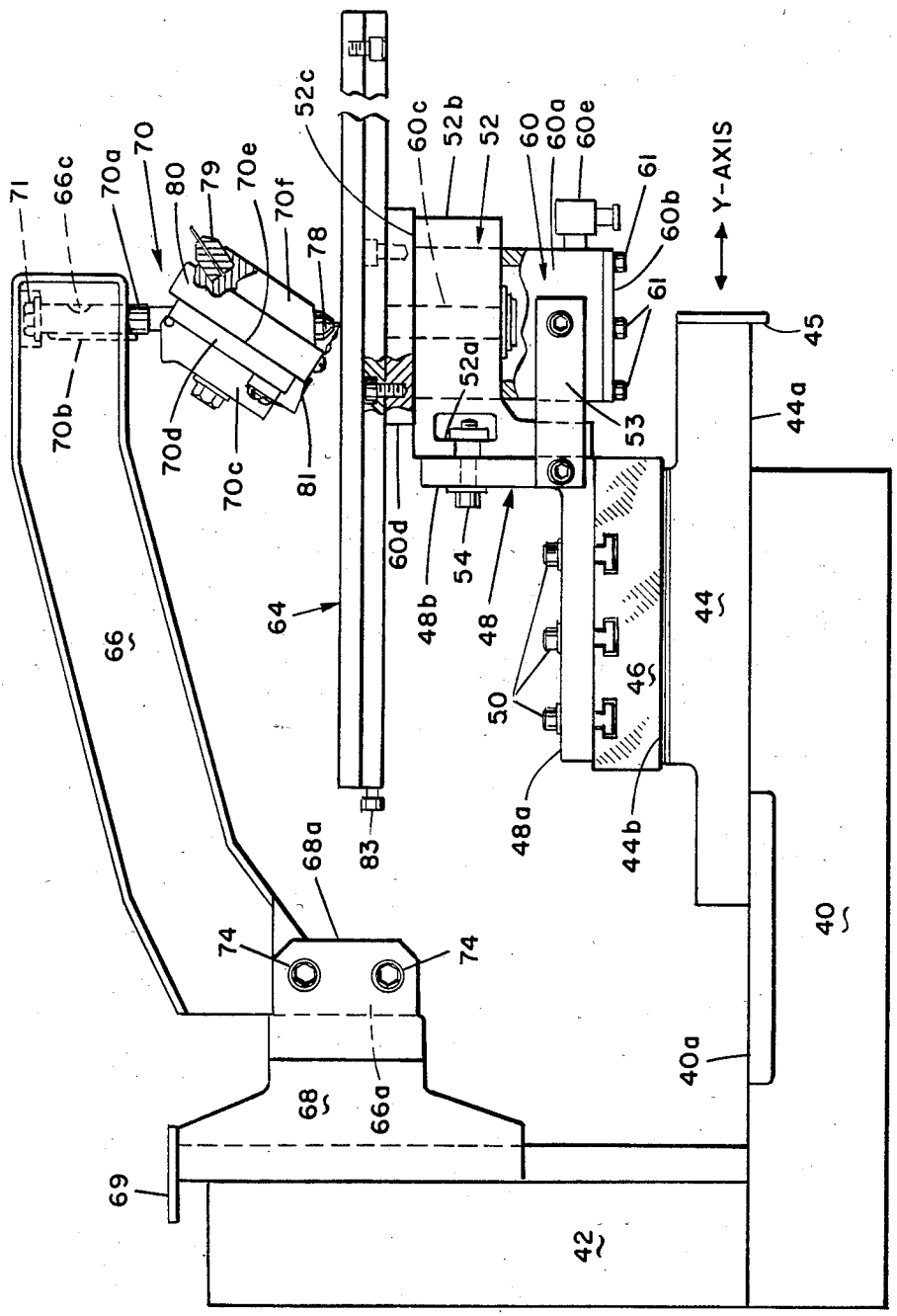
FIG. 4 is a side elevational view, partially broken away of the record engraving apparatus according to the invention.

The apertures 95–98 are countersunk on the upper surface for passing cap screws therethrough to secure the lower top 80 to the flange 60d (see also FIG. 4). Correspondingly, the two aperture sets 85–88 and 89–92 are countersunk at the bottom surface for passing cap screws therethrough for connection to the upper table top 82 (see also FIG. 5). To assist in indexing or aligning the table tops 80 and 82 relative to each other, a pair of dowel pin holes 99a and 99b are provided inwardly of apertures 86 and 87, respectively, these holes being dimensioned for receiving dowel pins (not shown) partially therein, and partially in aligned apertures of the upper table top 82.

Formed in the upper surface of the table top 80 are a plurality of interconnected channels, which will be generally designated 100, with portions thereof including a letter suffix designation. As will be described, the channel portions are in fluid flow communication with each other, and terminate at a common point at the center of top 80 for connection to a vacuum source which is drawn through the central opening or through hole 93. The periphery is provided with an opening 100a which extends along a line generally parallel to the diameter, this line including channel portion 100b with a constricted channel portion 100c therebetween which receives check valve 83 to act as a regulator of the vacuum. The channel portion 100a continues on a line inwardly, and then at an angle to the through hole 93.

Adjacent the center portion of the top 80, there is a circular channel portion 100d concentric with the through hole 93. Extending radially outwardly therefrom are channel portions 100e, 100f, 100g, 100h, and 100i, all being interconnected with channel portions 100d and 100b, and with constricted channel portion 100c and channel portion 100a.

Intersecting channel portion 100b are short channel portion 100j and long channel portion 100k having angularly directed channel portions 100m and 100n at the opposite ends thereof. A short channel portion 100q is provided as an offshoot of channel portion 100k at the diameter of the top 20. As shown in FIG. 9, the channel portions are shallow rounded grooves, such as illustrated by channel portion 100d, with the various portions of the channel means 100 being arranged and configured to assist in providing optimum vacuum to that portion of the table assembly 64 on which the master lacquer 20 is positioned.

Referring now to FIGS. 11 and 12, there is shown a top plan view of the upper table top 82, the top 82 being shown in aligned relation to the lower table top 80 in FIG. 8. The upper top 82 is configured to be positioned atop the lower table top 80. For ease of explantion, the apertures of top 82 intended for interconnecting with apertures of top 80 have been designated with the same reference numerals increased by one hundred, that is, for example, aperture 85 of lower table top 80 is intended to be aligned with threaded aperture 185 of upper table top 82.

Specifically, the outer set of countersunk apertures 85-88 of lower top 80 align with threaded apertures 185-188 of top 82; and the inner set of countersunk apertures 89-92 of lower top 80 align with threaded apertures 189-192, respectively of the upper top 82. Similarly, the dowel pin holes 99a and 99b of top 80 have counterparts 199a and 199b of top 82. In addition, the bushing members 193 and 194 of top 82 are positioned and configured to engage the apertures 93 and 94, respectively, of lower table top 80. It is to be understood, that with the exception of the bushings 193 and 194, the apertures of top 82 heretofore discussed, are partial holes, extending partially into the lower surface of the top 82, and are threaded to receive the threaded shafts of cap screws or the like. See, for example, aperture 191 in FIG. 12 as illustrative.

To facilitate the understanding of the assembly of the two tops 80 and 82, a dotted line depiction of the channel means 100 has been drawn on the upper table top 82, and it is to be understood that this dotted line depiction is not intended to depict any structure on the upper table top 82, but is simply intended for ease of explanation for reasons which will become obvious.

As previously briefly discussed, the upper table top 82 includes a plurality of apertures extending therethrough in general alignment with the various portions of the channel means 100. These apertures have been consecutively designated 105 through 130, inclusive, and as can be seen in FIG. 10, all of the apertures communicate with some channel portion of the channel means 100, the outline of which is shown in dotted lines. By referring to FIG. 12, it can be seen that such apertures, for example aperture 126, extend completely through the top 82.

An closed end bushing 193 is affixed to the center of the upper top 82 for engaging the aperture 93 at the center of the lower top 80 in snug fitting relation. Although not fully shown, the same would be true of offset bushing 194 and aperture 94.

With the two tops 80 and 82 coupled together, the top assembly 64 would be as illustrated in FIG. 4, with a valve 83 at the rearward end thereof being adapted for controlling the vacuum to preselected portions of the table assembly 64.

In use, a master lacquer 20 would be positioned relative to the upper surface of upper table top 82, either in the center or to the left of center, with the center of the lacquer 20 at the approximate center of either of the bushings 193 or 194. As can be seen, the leftmost half of the upper table top 82, as shown in FIG. 10, is provided with the vast majority of vacuum apertures for retaining the lacquer 20 thereon. To facilitate holding of the lacquer 20 this surface of upper table top 82 is provided with circular and arcuate shallow groove means, generally designated 101, which include first, a concentric circular groove 101a having bushing 193 at the center thereof; and second, two arcuate grooves 101b and 101c which are arcs of circles having bushing 194 as the centers thereof. These circular and arcuate grooves 101 are configured and dimensioned to receive therein the thicker edges of the master lacquer 20. By way of example, as previously discussed, with a ten inch master lacquer 20, the center thereof would be placed on the bushing 193, with the circular groove 101a being dimensioned and configured in radius, width and depth, for receiving the thicker peripheral underside therein. With twelve or fourteen inch master lacquers 20, the centers thereof would be aligned with the offset bushing 194, with the grooves 101c or 101b, respectively, receiving the thicker peripheral undersurface.

To assist in retention of the different size masters, means are provided for selectively blocking portions of the vacuum channels 100. To this end, the check valve 83 is depicted in FIG. 8 and is operatively positioned within the channels 100a, 100b and 100c. As shown, the valve 83 is configured with a neck portion 83a of a diameter slightly less then the diameter of the constricted channel portion 100c, with one end 83b of valve 83 having a diameter slightly less than the diameter of the channel 100b, and a length sufficient to intercept and block the juncture of channels 100b and 100k. With the valve 83 in the outward position depicted in FIG. 8, vacuum is drawn from through hole 93 through all channels 100; and when the valve 83 is pushed inwardly, the vacuum to channels 100h, 100k, 100m, and 100q is blocked.

When the ten inch master lacquer 20 is positioned on the center bushing 193, the valve 83 is pushed inwardly to block vacuum to the outermost channels, thereby providing maximum vacuum to retain the lacquer 20 on the table assembly 64. When the twelve inch or fourteen inch master lacquer 20 is centered on the offset bushing 194, all vacuum lines are opened by withdrawing the valve 83 to the outer position as depicted in FIG. 8.

In normal practice, a smaller master lacquer 20 is used when the record portion is rather large, and with the master lacquer centered on the bushing 193 of table assembly 64, and the record on true center, the record portion, the master lacquer 20 and the table assembly 64 are all rotating on center.

When smaller record portions 22 and 24 are desired, a larger master lacquer 20 is used, and positioned on the offset bushing 194, with the centers of the record portions 22 and 24 being radially displaced the same distance from the center of the lacquer 20. The radial distance from the center of the record portions 22 and 24 corresponds to the distance from the center of bushing 194 to the center of bushing 193, thereby placing the true center of each record portion 22, 24 at the true center of the table assembly 64. In this manner, rotation of the table assembly 64 causes the smaller record portions 22 and 24 to rotate about the respective centers thereof.

Referring again to FIGS. 5 through 7, the record engraving apparatus is shown completely assembled and mounted on a very firm surface, such as a "butcher block" table 200, with the control boxes, control panels and auxiliary devices included. As viewed in FIG. 6, the base 40 of the apparatus is secured to the table 200 at the left end thereof, with control box 202 affixed to the yoke 52, which is moveable with the Y-axis table 44. The control box 202 includes depressible switches for enabling "jogging" of the table assembly 64, that is, incremental angular positioning of the table assembly 64 in the clockwise or counterclockwise direction in response to momentary manual depression of the jog switches.

Similarly a control box 72 is affixed to the X-axis table 46 with "jog" switches on the front and side thereof. The front switches as viewed in FIG. 6 are for X-axis movement with the side switches as viewed in FIG. 5 being for Y-axis movement or "jogging". Also, as shown more fully in FIG. 5, a Z-axis control box 204 is secured to the bracket 68 for "jogging" along the Z-axis as required, that is manually operating the switches thereof to control the position of the arm 66, and consequently the vertical position of the heated sapphire cutters 78, 79, relative to the surface of the table assembly 64.

Secured to the table 200, such as by bolting, is a plate member 206 at the lower end of a generally L-shaped suspension arm 208, the free end of which is in generally vertical alignment with the turret assembly 70. Suspended from this free end is a pivotable support member 210 pivoted about a vertical axis. Coupled to the support member 210 is a binocular microscope assembly 212 pivotable about a horizontal axis 214, these two axes enabling an operator to precisely position the microscope for viewing the master lacquer 20 during forming of the lead-in grooves thereon, or for inspection purposes, while enabling the movement of the microscope assembly 212 out of the way for positioning or removing of the master lacquer 20.

With reference to FIG. 6, adjacent the cutter 78, there is shown a dark line 220, this line being connected to a suction or vacuum source for chip or debris removal during engraving of the master lacquer 20. Extending from the front of housing 60, there is another dark line designated 222, this line being the vacuum line for supplying the vacuum to the table 64 through the vacuum fitting 60e, through the vacuum chamber 60a, through the aperture of the journal 60c to the channels 100 from a vacuum source, not shown. Control cabinets 224 and 226 are affixed to the table 200, the control cabinet 224 housing the electrical devices for controlling the heating of the cutter 78 through darkened lead cable 225, while cabinet 226 includes the components required for digital control of the apparatus in the various directions, that is, this cabinet 226 is the CNC control panel.

In addition to those devices shown, a high intensity light source may be used for enhancing the illumination at the surface of the master lacquer 20. Although not shown, a suitable digital reading device such as a magnetic or perforated tape reader or would be utilized for enabling use of the system, as shown. By way of example, the controller cabinet 226 houses components which preread a magnetic tape, with instructions from the tape being stored in such components for operation of the apparatus. However, such items do not form a part of the present invention.

In accordance with the present invention, by utilization of the precise positioning capabilities of a computerized numerical control milling machine, the herein described improvements enable the use of the record engraving apparatus to securely retain a master lacquer 20 on the table assembly 64 and to accurately and precisely control relative movement between the master lacquer 20 and the heated sapphire cutter 78 (or the other cutters 79, etc.) in the X-axis, Y-axis, and Z-axis as well as the angular position of the lacquer 20 to effect accurate cutting of lead-in grooves 22a-22l of the record portion 22 (as well as similar grooves on record portion 24), this cutting being accurate in length, depth and angular position about the periphery of each record portion 22 and 24.

While there has been shown and described a preferred embodiment, it is to be understood that various other adaptations and modifications may be made within the spirit and scope of the invention.

We claim:

1. In an engraving apparatus for forming grooves of predetermined length and configuration at preselected positions relative to previously recorded record portions of a master record disc or lacquer, the apparatus having a base, a first table secured thereto for movement in a first direction relative to said base, a second table secured to said first table for movement in an orthogonal direction relative to said first table, an angularly positionable third table coupled to said second table for movement therewith, and processor means for precisely positioning the first and second tables relative to the base and for precisely angularly positioning said third table relative to said second table, the improvement comprising:

arm means coupled to said base;
   cutting means on said arm means in proximate relation to said third table and positionable in a direction generally perpendicular to the plane of said third table;
   means on said third table for enabling retention thereon of a generally disc-shaped master lacquer mean and plural positioning mean for positioning the center of said master lacquer means at one of at least two locations on said third table for enabling positioning of the centers of said record portions in generally proximate relation to said cutting means; and
   means responsive to said processor means for enabling angular positioning of said third table and movement of said cutting means in a direction generally perpendicular to the plane of said master lacquer means for enabling engraving of grooves of predetermined depth at preselected locations relative to said prerecorded record portions on said master lacquer means in accordance with the position of said cutting means, the angular position of said third table and in accordance with the positioning of said first and second tables.

2. The combination according to claim 1 wherein said means for retention of said master lacquer means on said table means includes vacuum means.

3. The combination according to claim 2 wherein said table means includes disc-shaped table means having aperture means therein for providing vacuum to retain said master lacquer means thereon.

4. The combination according to claim 3 wherein said cutting means includes turret means having a plurality of cutting members thereon, said turret means being rotatable for positioning a predetermined cutting member in position for engraving said master lacquer means.

5. The combination according to claim 4 wherein said arm means includes a post member fixedly secured to said base in generally perpendicular relation thereto, a bracket member slidably movable relative to said post member and an arm having one end thereof secured to said bracket member and the other end thereof in suspended relation relative to the plane of said disc-shaped table means.

6. The combination according to claim 5 wherein said disc-shaped table means includes generally identically configured upper and lower disc-shaped table members coupled together, the lower member having channel means formed on the upper surface thereof for forming a channel connectable to a vacuum source, and the upper table member having aperture means therethrough in communication with said channel means for adhering a master lacquer means thereon by vacuum.

7. The combination according to claim 6 wherein said cutting member is an electrically heated cutting member and said apparatus further includes means for providing electrical energy to said cutting member.

8. The combination according to claim 7 wherein said cutting member is a heated sapphire cutting member.

9. The combination according to claim 4 wherein said turret means includes at least two cutting members of different configuration.

10. The combination according to claim 9 wherein each of said cutting members is an electrically heatable cutting member and said apparatus further includes means for providing electrical energy to said cutting members.

11. The combination according to claim 2 further including valve means for selectively controlling the vacuum to predetermined portions of said third table.

12. The combination according to claim 6 further including valve means for selectively blocking predetermined portions of said channel means.

13. In an engraving apparatus for forming groves of predetermined length and configuration at preselected positions relative to previously recorded record portions of a master record disc or lacquer, the apparatus having a base, a first table secured thereto for movement in a first direction relative to said base, a second table secured to said first table for movement in an orthogonal direction relative to said first table, an angularly positionable third table coupled to said second table for movement therewith, and processor means for precisely positioning the first and second tables relative to the base, the improvement comprising:

arm means coupled to said base, said third table being formed of a first disc-shaped member having channel means formed in the surface thereof, and a second generally identically dimensioned disc-shaped member overlying said first disc-shaped member, said second disc-shaped member having aperture means extending therethrough with said apertures in registration with said channel menas for enabling application of a vacuum through said channel means and said aperture means for retaining master lacquer means on said third table;

cutting means on said arm means in proximate relation to said third table and positionable in a direction generally perpendicular to the plane of said third table;

means on said third table for enabling retention thereon of said master lacquer means and plural positioning means for positioning the center of said master lacquer means at one of at least two locations on said third table for enabling positioning of the centers of said record portions in generally proximate relation to said cutting means; and means responsive to said processor means for enabling angular positioning of said third table and movement of said cutting means in a direction generally perpendicular to the plane of said master lacquer means for enabling engraving of grooves of predetermined depth at preselected locations relative to said prerecorded record portions on said master lacquer means in accordance with the position of said cutting means, the angular position of said third table and in accordance with the positioning of said first and second tables.

14. The combination according to claim 13 wherein said cutting means includes turret means having a plurality of cutting members thereon, said turret means being rotatable for positioning a predetermined cutting member in position for engraving said master lacquer means.

15. The combination according to claim 13 wherein said arm means includes a post member fixedly secured to said base in generally perpendicular relation thereto, a bracket member slidably movable relative to said post member and an arm having one end thereof secured to said bracket member and the other end thereof in suspended relation relative to the plane of said disc-shaped table means.

16. The combination according to claim 14 wherein said cutting member is an electrically heated cutting member and said apparatus further includes means for providing electrical energy to said cutting member.

17. The combination according to claim 16 wherein said cutting member is a heated sapphire cutting member.

18. The combination according to claim 14 wherein said turret means includes at least two cutting members of different configuration.

19. The combination according to claim 18 wherein each of said cutting members is an electrically heatable cutting member and said apparatus further includes means for providing electrical energy to said cutting members.

20. The combination according to claim 13 further including valve means for selectively blocking predetermined portions of said channel means.

* * * * *